Dec. 13, 1938.   M. A. HIRSCHL ET AL   2,139,681
VACUUM MOISTENING PROCESS
Filed Oct. 11, 1937
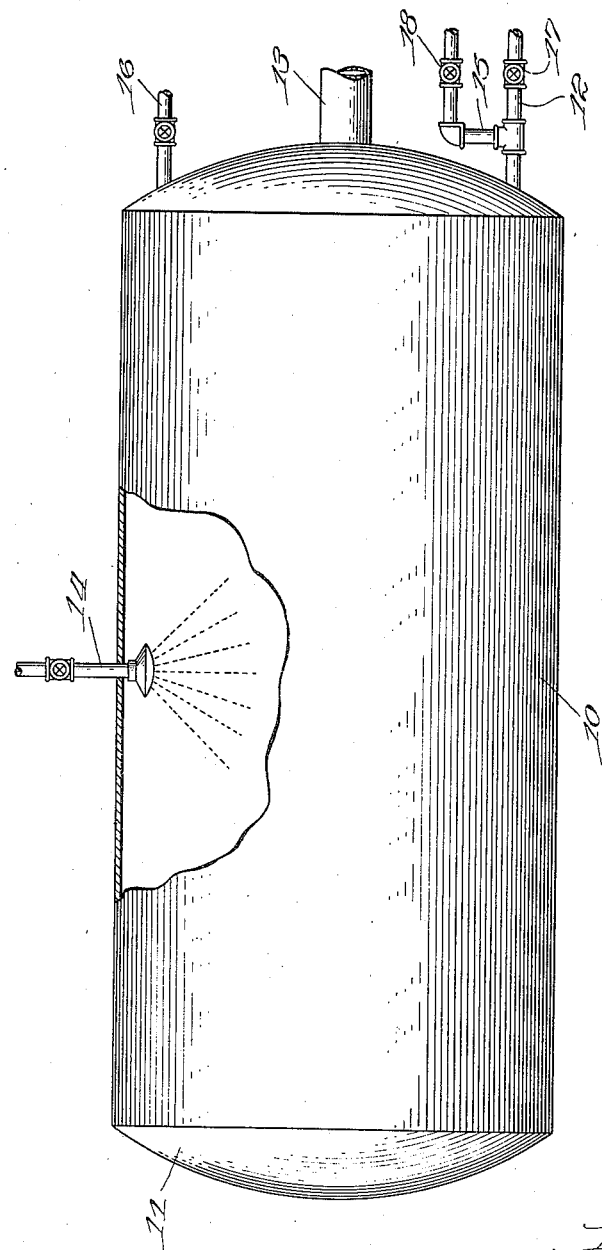
Inventors:
Marcus A. Hirschl
and Charles J. Merriam.
By Chritton, Wiles, Davies, Hirschl & Dawson.
Attys.

Patented Dec. 13, 1938

2,139,681

UNITED STATES PATENT OFFICE 2,139,681

VACUUM MOISTENING PROCESS

Marcus A. Hirschl, Chicago, and Charles J. Merriam, Winnetka, Ill., assignors to The Gaurdite Corporation, a corporation of Illinois Application October 11, 1937, Serial No. 168,529

2 Claims. (Cl. 131—55)

This invention relates to a process for moistening products, primarily organic, in which a vacuum is employed followed by steaming.

In such an operation the organic product is subjected in bulk to a vacuum in a closed chamber, and after removal of most of the non-condensible gas, steam is admitted while retaining a vacuum in the tank, and after the moistening operation is completed, the tank is open to the air which is allowed to enter the tank and raise the pressure to atmospheric.

It has now been discovered that in such a treatment there is a tendency to dry out such portions of the organic product as may be somewhat more exposed. For instance, in a hogshead of tobacco, those portions of the tobacco which are exposed between the boards are found to be somewhat more dry than the central leaves.

It has now been discovered that a considerable portion of this dryness is due to the admission of air as the final stage in the operation of the process. The air that enters the tank at this stage, even if originally saturated with water vapor, while expanding has a great capacity for water and therefore has a very serious drying effect upon material over which it passes.

In accordance with the present invention, the air admitted to the tank is supersaturated with water either in the form of steam or as finely divided liquid water so that the products which it meets first in its travel will not be subjected to a drying operation.

Furthermore, as the pressure continues to rise in the tank, the capacity of the air therein for water becomes less, so that ultimately that moisture added to the air above saturation is precipitated out upon the product being treated.

The invention is illustrated diagrammatically in the drawing in which 10 is a tight tank of any desired design equipped with a door 11, a vacuum outlet 13 leading to any suitable vacuum pump or jet, preferably one capable of producing a vacuum sufficient to cause water contained in the organic product to boil.

The tank is also provided with a steam inlet 16 and an air inlet or vent 12. Associated with, and preferably directly within, the air inlet 12 is a line 15 controlled by valve 18 through which steam or water may be introduced.

Likewise, within the tank is a spray 14, through which water may be introduced to cause an extremely fine mist within the tank.

As a typical operation of the process, tobacco in hogsheads, which normally contain around 1,000 lbs. of tobacco, is placed in the tank, the door 11 closed and a vacuum pulled through the line 13 until the temperature of the tobacco has dropped say 10° because of boiling of contained moisture. Water is then admitted through the spray 14, followed by steam through the line 16. This operation may be followed, and preferably is, by a second evacuation, followed by steaming.

After the moistening operation is complete, the valve 17 on the air inlet 12 is opened and air allowed to enter the tank, at the same time the steam line 15 being opened and steam admitted through the valve 18. The ratio of steam to air is adjusted in accordance with the temperature of the tank, the temperature of the air and the moisture content of the air, so that the air will not be unduly heated, and at the same time so that it will not have an appreciable drying effect. It is preferred to supersaturate the air very substantially with moisture.

In certain cases it may be desirable to introduce liquid water through the line 18, but in this event it is preferred to use a fog nozzle of any ordinary type in order to atomize the water. In this manner, if the moisture is made fine enough the incoming air will carry some of the liquid water into the tobacco and further moisten it.

The invention is applicable to other products such as grain, or even to inorganic products; air and moisture are factors.

We claim:

1. The method of treating a product to moisten it, which comprises subjecting the product to a high vacuum, admitting steam thereto while maintaining a high vacuum, and then breaking the vacuum by admission of air supersaturated with moisture.

2. The method of treating a product to moisten it, which comprises subjecting the product to a high vacuum, admitting steam thereto while maintaining a vacuum, and then breaking the vacuum by admitting air thereto and simultaneously introducing moisture with the air, whereby evaporation of moisture by the air is substantially avoided.

MARCUS A. HIRSCHL.
CHARLES J. MERRIAM.